United States Patent [19]

Dick et al.

[11] 4,380,099
[45] Apr. 19, 1983

[54] ATTACHMENT DEVICE FOR COMPONENTS MOUNTED IN RECESSES IN VEHICLE BODYWORK

[75] Inventors: Heinz Dick, Odenthal; Hans Lux, Cologne, both of Fed. Rep. of Germany

[73] Assignee: Ford Motor Company, Dearborn, Mich.

[21] Appl. No.: 287,847

[22] Filed: Jul. 29, 1981

[30] Foreign Application Priority Data

Nov. 25, 1980 [DE] Fed. Rep. of Germany ....... 3044313

[51] Int. Cl.³ .............................................. A44B 21/00
[52] U.S. Cl. .................................... 24/211 P; 24/214
[58] Field of Search ................. 24/211 M, 211 P, 212, 24/213 R, 213 B, 214, 224 R, 237, 248 B

[56] References Cited

U.S. PATENT DOCUMENTS 2,634,472  4/1953  Brown .............................. 24/214 X
4,305,182  12/1981  Peterson ...................... 24/213 R X
4,325,526  4/1982  Kitagawa ...................... 24/248 B X

FOREIGN PATENT DOCUMENTS 663395  12/1951  United Kingdom ............. 24/213 R

*Primary Examiner*—Robert P. Swiatek
*Attorney, Agent, or Firm*—John J. Roethel; Clifford L. Sadler; Daniel M. Stock

[57] ABSTRACT

Attachment of fastening device for components or assemblies received in recesses of vehicle body members. The component carries a pivot pin adapted to be received in an opening in a wall of the recess in the body member. A V-shaped resilient clamp and an S-shaped resilient support member hold the component or assembly in place. The component or assembly can be removed without a tool merely by depressing the same deeper into the recess and thereby automatically releasing the clamp.

6 Claims, 8 Drawing Figures

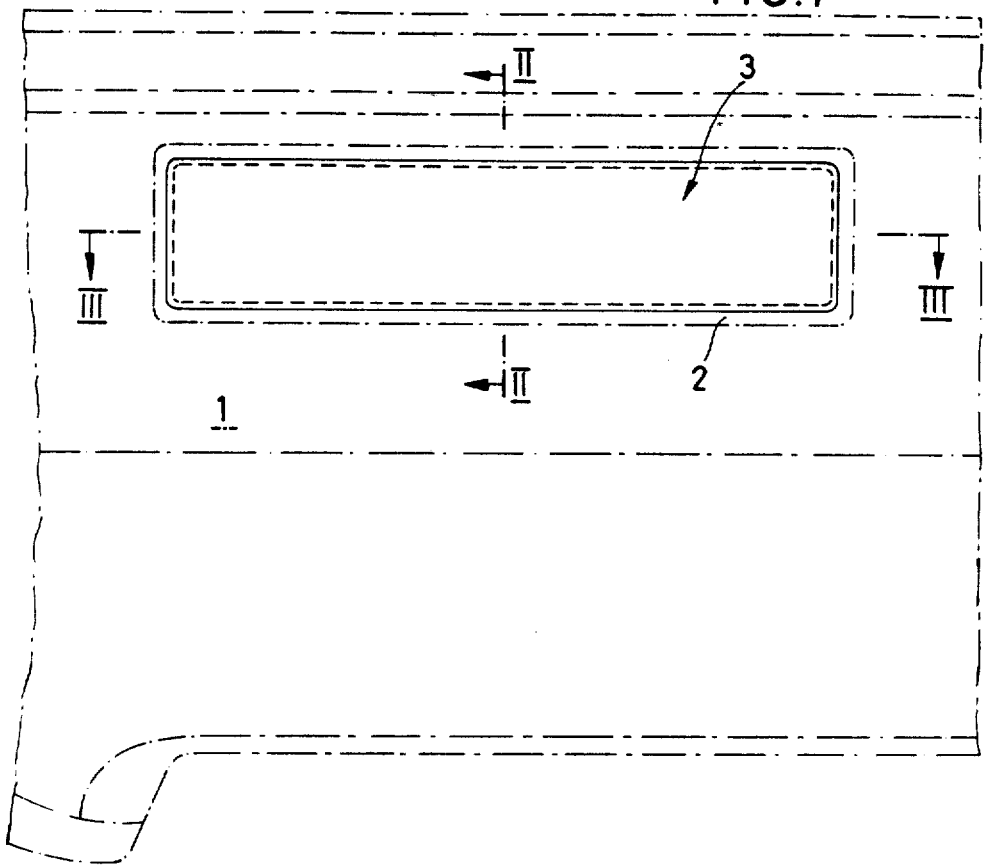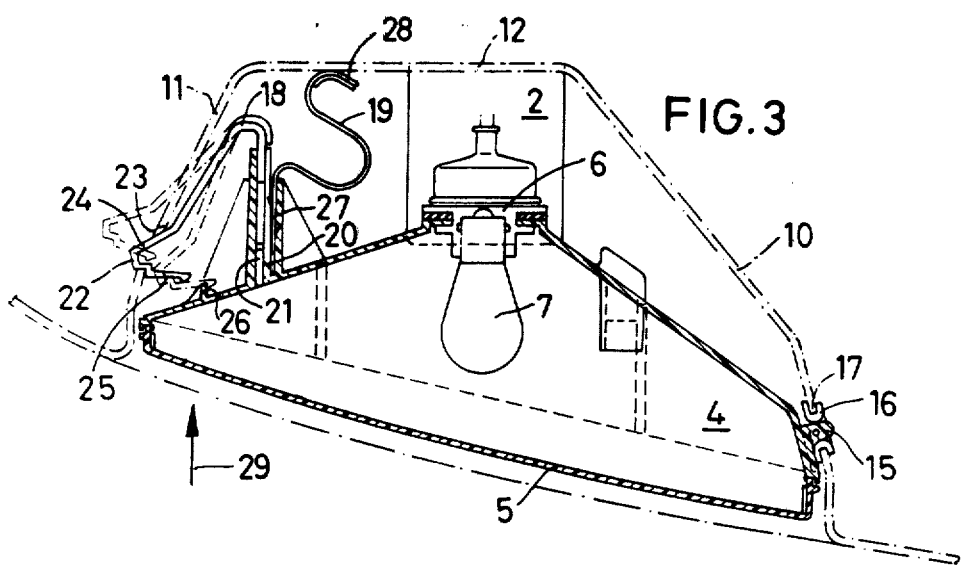

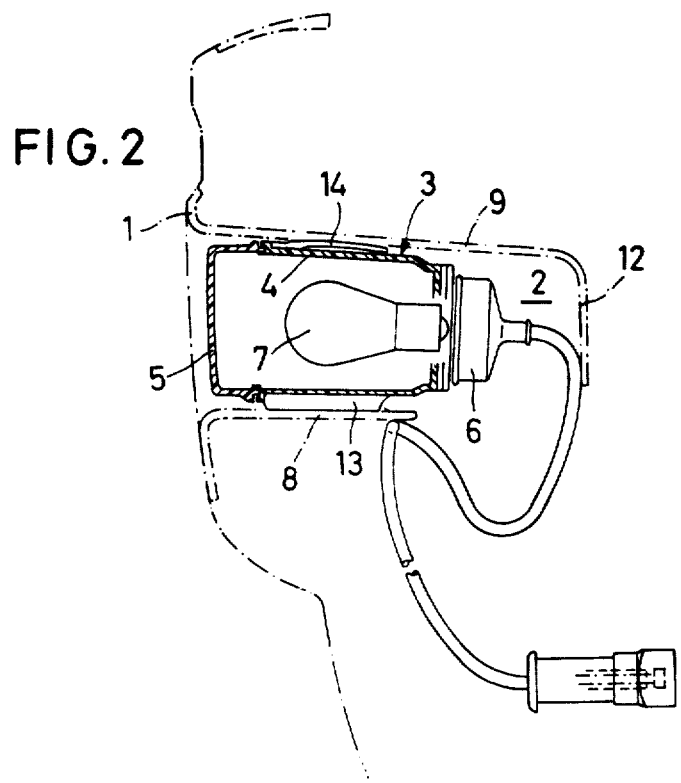
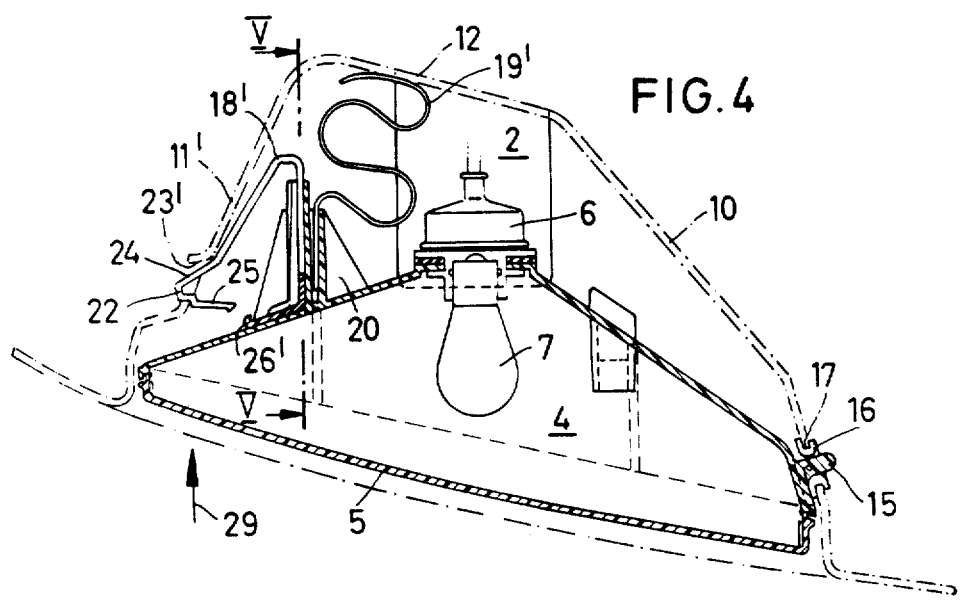

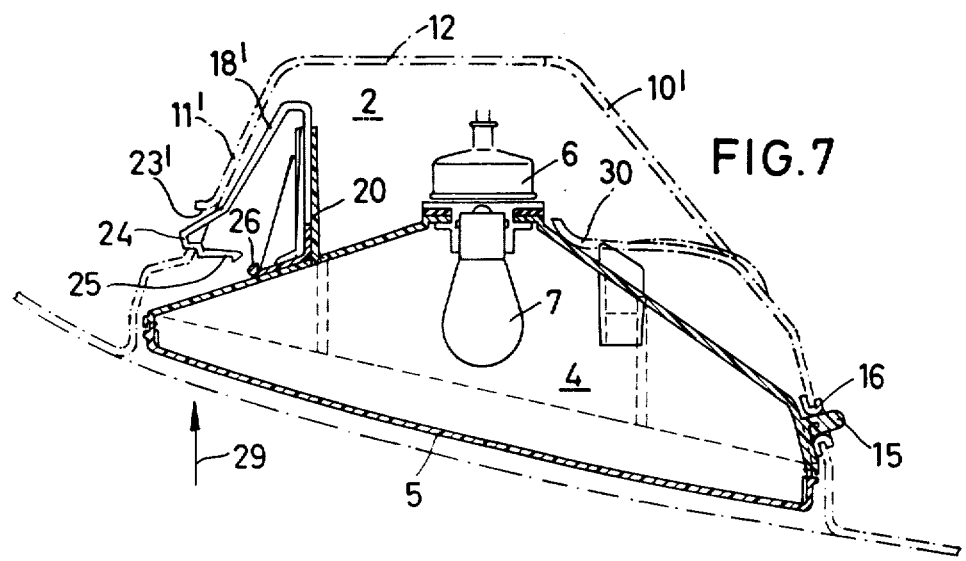
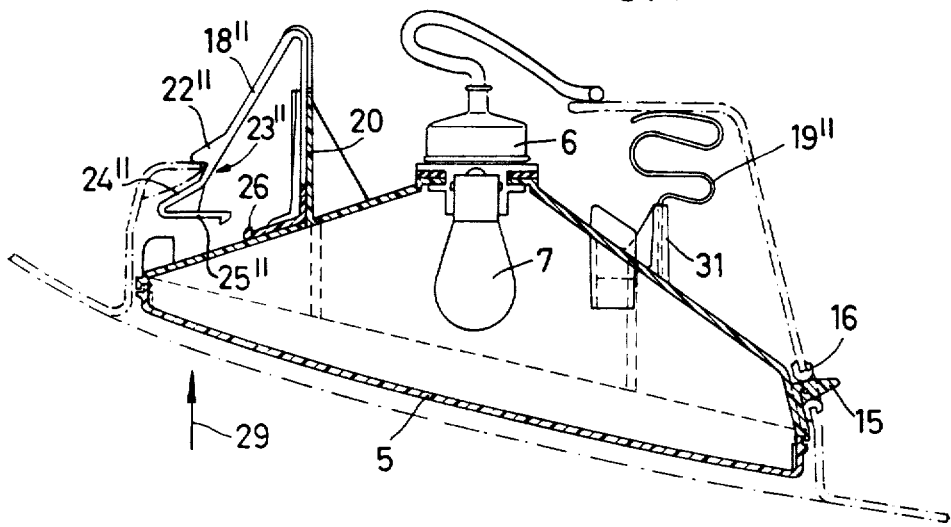

ATTACHMENT DEVICE FOR COMPONENTS MOUNTED IN RECESSES IN VEHICLE BODYWORK

BACKGROUND OF THE INVENTION

The invention relates to an attachment device for components mounted in recesses in vehicle bodywork, the components having clamps, supports and holders that are fixed or formed on the component and which interact with apertures and walls of the recess in order to hold the component in an easily detachable fashion in the bodywork.

German patent DE-AS 20 29 275 discloses an attachment device of approximately the type in which clamps, supports and holders fixed on the component can only be reached from behind the recess wall of the bodywork in order to detach the component.

German patent DE-AS 23 12 579 discloses an attachment device of approximately the foregoing type in which clamps, supports and holders formed on the component are accessible only from the front side of the bodywork via a narrow gap by means of flat tools in order to detach the component.

German patent DE-PS 25 42 920 discloses an attachment device of approximately the foregoing type in which one holder on the component is in the form of a swivel pin and another holder is in the form of a screwed connection accessible only from the outside of the recess in the bodywork in order to detach the component.

SUMMARY OF THE INVENTION

The attachment device embodying the present invention provides on the one hand that a simple mounting of the component in a recess of a vehicle bodywork is assured, and on the other hand that no accessible area has to be kept free or that tools which are difficult to use are required in order to detach this component.

As noted in the discussion of the prior art, a holder formed on the component in known fashion is in the form of a swivel pin interacting with an aperture in the recess. A V-shaped flexible clamp and an S-shaped flexible support part are inserted in a mounting on the component and interact with a correspondingly formed aperture in or with a wall of the recess in such a way that when the component is in its normal position, a head of the clamp engages in the aperture. In the event of an inward movement of the component beyond its normal position against the spring tension of the support, the head disengages from the aperture through a bevel on the clamp interacting with the aperture. The head is held in its loose position by a catch on one edge of a detent on the component. It is possible to detach the component from the recess of the vehicle bodywork from the front side without additional tools simply by a specified, deeper, manual pressing-in of the component into the mounting recess.

The V-shaped flexible clamp and the S-shaped flexible support part can here be made preferably in one piece from flexible plastic material.

According to a further embodiment, the S-shaped flexible support part can also be formed by a free-cut, S-shaped tongue of the wall of the recess.

The described embodiments of the attachment device according to the invention, whereby the releasing of a clamp holding a component is effected by a specified pressing-in of the component into its mounting recess, represent only a few samples of possible embodiments with the same mode of operation.

DETAILED DESCRIPTION OF THE DRAWINGS

The invention is explained in greater detail with the aid of exemplified embodiments shown in the drawings, as follows:

FIG. 1 is a partial view of a vehicle bodywork with a component disposed in a recess which is held by an attachment device according to the invention;

FIG. 2 is a vertical section along the line II—II in FIG. 1;

FIG. 3 is a horizontal section along the line III—III in FIG. 1;

FIG. 4 is a horizontal section similar to FIG. 3 through a further exemplified embodiment of an attachment device according to the invention;

FIG. 7 is a similar horizontal section to FIG. 3 through a further exemplified embodiment of an attachment device according to the invention; and FIG. 8 is a similar horizontal section to FIG. 3 through a further exemplified embodiment of an attachment device according to the invention.

DETAILED DESCRIPTION

Figure 5:
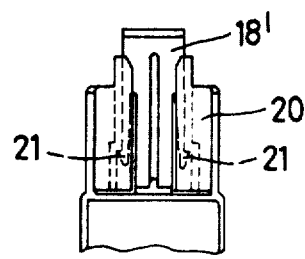
FIG. 5 is a section along the line V—V in FIG. 4.

In FIGS. 1 to 3 is a part of a vehicle bodywork 1, in this particular case a flexible plastic front bumper plate for a vehicle shown in dash-dot lines and provided with a recess 2 for mounting a component generally designated 3, in this case a flasher lamp. The component or the flasher lamp 3 consists basically of a housing 4 which is enclosed on its front side by a lens 5 and on its rear side takes a lampholder 6 with a bulb 7.

The recess 2 in the bodywork 1 here has upper and lower wall sections 8 and 9, lateral wall sections 10 and 11, and a rear wall section 12.

The housing 4 of the flasher lamp 3 is provided on its underside with guide bars 13 and on its upper side with guide tongues 14 which ensure a parallel position of the lamp in the recess 2.

The attachment device according to the invention consists on the one hand of a swivel pin 15 formed on the housing 4 of the lamp 3 that intersects with an aperture 17 of one of the side wall sections 10 of the recess 2. The aperture 17 preferably is equipped with an elastic socket 16. On the other hand, the attachment device consists of a V-shaped flexible clamp 18 having a plurality of arms and an S-shaped flexible support part 19 both of which are inserted in a mounting 20 on the housing 4.

The V-shaped flexible clamp 18 is provided on one of its arms with catches 21 by means of which it is fixed in the mounting 20. The clamp 18 is provided on its other arm with a head 22 which interlocks with a complementarily formed aperture 23 in the side wall section 11 of the recess. The head 22 has on one side a bevel 24 and on the other side a catch 25. The bevel 24 intersects with the aperture 23 if the clamp 18 is pressed deeper into the recess 2 in such a way that the V-shaped flexible clamp 18 is compressed to the extent that the catch 25 engages behind an edge of a detent 26 formed on the housing 4.

The V-shaped flexible clamp 18 is here shown in solid lines in FIG. 3 in its locked position, while its fully released position and its fixed loose position are shown in dash-dot lines.

The S-shaped support 19 consists of a spring steel band and has a foot 27 provided with barbs with which it is fixed in the mounting 20 and a head 28 by which it is supported against the rear wall section 12 of the recess 2.

If the flasher lamp is now to be fixed in the recess 2 of the bodywork 1, then the V-shaped flexible clamp 18 and the S-shaped support 19 are inserted into the mounting 20 on the housing 4. Thereafter, the housing 4 with the swivel pin 15 is inserted into the socket 16 of the aperture 17 and swivelled back in the direction of the arrow 29. The clamp 18 is here in its fully released position. As soon as the lamp 3 has reached the specified normal position, the head 22 of the clamp 18 engages in the aperture 23 in the side wall section 11 of the recess 2. The flasher lamp 3 is thus fixed.

If the flasher lamp 3 is now to be removed for the purpose, e.g., of a bulb change, then no kind of tool is required. The lamp 3 must simply be manually pressed further into the recess 2 in the direction of arrow 29 until the clamp 18, through the effect of the bevel 24 in connection with the aperture 23, is compressed to such an extent that its locking tongue 25 fixes it at the edge 26 of the notch in its loose position. As soon as this has been done, the pressure in the direction of arrow 29 is reduced and the support 19 will pivot the flasher lamp 3 outwards, round the swivel pin 15. The holder 6 is now accessible for the purpose of changing the bulb.

If, after the bulb change, the flasher lamp 3 is to be remounted, then the clamp 18 must be brought manually back into its released position so that the clamp 18 can lock the flasher lamp 3 which is moved in the direction of arrow 29 in its normal position.

The exemplified embodiments shown in the other Figures correspond basically with the exemplified embodiment described in FIGS. 1 and 3 so that for the same parts, the same symbols are used, and for changed parts, primed symbols are used.

In FIGS. 4 and 5 is shown a preferred embodiment of a V-shaped flexible clamp 18'. This embodiment differs from those explained above only in that the edge of the clamp interacting with the catch 25 is formed not on the housing 4, but as a clamp edge 26' on a bend in the clamp 18' itself.

The S-shaped flexible support is here shown as a support 19' having further bends.

The aperture in the side wall section 11 is here in the form of a slightly inverted aperture 23'.

Figure 6:
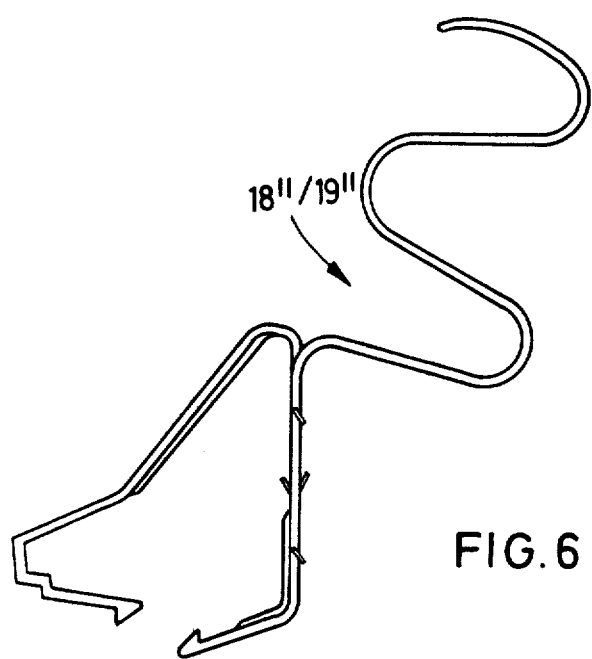
FIG. 6 is a view of a clamp and support part made in one piece of flexible plastic material.

In FIG. 6 is shown a particularly advantageous embodiment in which the V-shaped flexible clamp is combined with the S-shaped support in a one-piece plastic component 18"/19".

FIG. 7 shows a further embodiment in which an S-shaped tongue 30, free-cut with the side wall section 10' of the recess 2, takes over the function of the flexible support.

In corresponding structural conditions on the part of the vehicle bodywork, that is, for example, if this is made of plastic, the function of the V-shaped clamp can also be provided by a correspondingly designed free-cut tongue in the wall of the recess.

In FIG. 8, a further embodiment is shown in which another form of the clamp 18' is provided. The engaging head 22" is disposed horizontally behind the bevel 24" and can interact with a straight aperture 23". A flexible corrugated support 19" is here disposed on its own mounting 31.

We claim:

1. Attachment device for a component mounted in a recess in a vehicle bodywork with clamps, supports and holders that are operatively disposed between the component and the walls of the recess and which interact with apertures formed in the walls of the recess in order to hold the component in an easily detachable fashion in the bodywork;

the attachment comprising:

a holder on the component in the form of a swivel pin interacting with a recess wall aperture;

a substantially V-shaped clamp interacting with a complementarily formed aperture in the wall of the recess in such a way that when the component is in its normal position a head of the clamp engages in the aperture;

an S-shaped flexible support interposed between the component and the recess wall exerting an outward biasing force on the component when in said normal position; and in the event of an inwards movement of the component beyond the normal position against the biasing force of the support the head being released from the aperture by a bevel on the clamp;

the clamp then interacting with the aperture and being held in a loose position by means of a catch on one edge of a detent fixed on the component.

2. Attachment device as in claim 1, in which the edge of the detent for the catch is on a bend in the clamp.

3. Attachment device as in claim 2 in which the V-shaped flexible clamp and the S-shaped flexible support are in the form of a unitary resilient plastic part.

4. Attachment device as in claim 1 in which the V-shaped clamp and the S-shaped flexible support are in the form of a unitary resilient plastic part.

5. Attachment device as in claim 1 in which the S-shaped flexible support is formed by a slightly S-shaped, free-cut tongue of the lateral section of the wall of the recess.

6. Attachment device as in claim 5 in which the S-shaped flexible support is formed by a slightly S-shaped, free-cut tongue of the lateral section of the wall of the recess.

* * * * *